United States Patent
Roth

(10) Patent No.: US 8,156,628 B2
(45) Date of Patent: Apr. 17, 2012

(54) HOLDING DEVICE

(75) Inventor: Ingo Roth, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1153 days.

(21) Appl. No.: 11/959,979

(22) Filed: Dec. 19, 2007

(65) Prior Publication Data

US 2008/0143030 A1   Jun. 19, 2008

Related U.S. Application Data

(60) Provisional application No. 60/870,627, filed on Dec. 19, 2006.

(30) Foreign Application Priority Data

Dec. 19, 2006  (DE) .......................... 10 2006 060 074

(51) Int. Cl.
*B23P 19/00* (2006.01)
*F16B 7/10* (2006.01)

(52) U.S. Cl. ................. 29/426.1; 403/109.3; 403/109.2; 292/17; 292/303; 24/662; 29/426.5; 29/426.6

(58) Field of Classification Search .................. 29/426.1, 29/426.5, 426.6; 292/17, 303, DIG. 55; 403/109.2, 403/109.3, 109.7, DIG. 1; 24/108, 662, 704.1
See application file for complete search history.

(56) References Cited

U.S. PATENT DOCUMENTS

| | | | | |
|---|---|---|---|---|
| 2,203,973 A * | 6/1940 | Walls | ............................. | 439/848 |
| 2,486,003 A * | 10/1949 | Christensen | .................... | 292/59 |
| 3,638,285 A | 2/1972 | Sanchez Giraldez | | |
| 4,407,383 A * | 10/1983 | Enokimoto et al. | .......... | 180/291 |
| 4,562,626 A * | 1/1986 | Lance | ............................. | 24/689 |
| 4,716,922 A * | 1/1988 | Camp | ............................. | 137/296 |
| 4,745,664 A * | 5/1988 | Damvig | ........................ | 24/704.1 |
| 4,884,833 A * | 12/1989 | Pedersen | ....................... | 292/316 |
| 5,600,213 A * | 2/1997 | Hiramoto et al. | ............. | 315/507 |
| 5,600,977 A * | 2/1997 | Piron | ............................. | 70/57.1 |
| 6,149,213 A * | 11/2000 | Sokurenko et al. | ........... | 292/340 |
| 6,948,685 B2 * | 9/2005 | Hawthorne | ................ | 244/129.1 |
| 7,125,058 B2 * | 10/2006 | Hawthorne | ................ | 294/82.28 |
| 7,575,389 B2 * | 8/2009 | Nance | ........................ | 403/109.2 |

FOREIGN PATENT DOCUMENTS

| | | |
|---|---|---|
| DE | 2009760 | 9/1971 |
| DE | 9212842.2 U1 | 1/1993 |
| DE | 202005020615 U1 | 6/2006 |
| DE | 202006013953 U1 | 12/2006 |

OTHER PUBLICATIONS

German Office Action dated Jul. 31, 2007 for German application No. 10 2006 060 074.6-12, 5 pages.

* cited by examiner

*Primary Examiner* — Essama Omgba
(74) *Attorney, Agent, or Firm* — Christopher Paradies; Fowler White Boggs P.A.

(57) ABSTRACT

A holding device for holding a structural component for aircraft to a further structural component; may be coupled to one of the components and is moved from a holding mode, where the first component is held to the second component by the holding device, to a release mode using a magnetic force. Furthermore, a method for deinstalling two components is disclosed, where carrying out deinstallation merely requires pressing a first component against a second component, and placing a magnetic key on or over one of the components in the region of the holding device, where at least some method-related steps may take place at substantially the same time.

10 Claims, 2 Drawing Sheets

HOLDING DEVICE

REFERENCE TO RELATED APPLICATION

This application claims the benefit of the filing date of German Patent Application No. 10 2006 060 074.6 filed Dec. 19, 2006 and of U.S. Provisional Patent Application 60/870,627 filed Dec. 19, 2006, the disclosures of which applications are hereby incorporated herein by reference.

FIELD OF THE INVENTION

The field relates to a holding device for holding components, a deinstallation method for components that comprise holding devices, and to an aircraft, as well as to a set comprising the holding device.

BACKGROUND OF THE INVENTION

As is generally known, components, for example, in the form of cabin components, for example, in the form of ceiling- or wall elements, are held to other components, i.e., generally to structural components, but also to other holding devices, the majority of which are complementary, by means of holding devices, for example, in the form of screws, pins, bushes, hooks or dowels. In such arrangements, the holding devices are accessible for deinstallation by means of openings, recessed in the component, in the form of gaps or holes. The holding devices may be covered with additional elements, for example, with caps made of plastic.

In such arrangements, the ability to freely position the holding devices is very limited for aesthetic and practical reasons, because the above-mentioned access needs to be ensured at all times, and as little of the holding technology as possible is to be visible. The presence of aesthetically displeasing, i.e. visible holes, is a problem that is often encountered in this context. Furthermore, accessibility by maintenance personnel may be difficult as a result of gaps or seals because the components completely or partly cover the holding devices to be undone, thus rendering the holding devices invisible to maintenance personnel. Because of the problems mentioned above, balancing aesthetics against the safe distribution of the holding devices, in a manner that takes account of the loads experienced, is often a compromise with suboptimal scope for resolution.

SUMMARY OF THE INVENTION

Among other things, it may be an object to at least partly solve the problems, as mentioned above, which problems are associated with known holding devices, and to propose a corresponding holding device. It may be a further object to propose a method by means of which method, deinstallation of components may be achieved more easily.

The holding device according to one example, may be suitable for holding a first component to a second component. One of these components may be a structural component of an aircraft, for example, a wall panel of the aircraft cabin. In this case, the other component may be a holding element which may be made to engage the holding device, for example, by means of a pin. The holding element in turn may be connected to a frame element or to other elements, or it may be made in one part with the former. The other component may also be a structural component. In other words, both components may be structural components, in particular of an aircraft. Furthermore, the above-mentioned connection may be achieved by screwing or gluing. Generally speaking, all known fastening options are available to the person of ordinary skill in the art.

In the case of the wall panel, which has been mentioned only as an example, the wall panel may thus be directly connected, i.e. by way of the holding element and if applicable other elements, or indirectly be connected to the other component. Just like the above-mentioned holding element, the holding device, too, may be coupled, i.e. glued or screwed, to one of the components.

According to one example, the holding device may be moved from a holding mode, in which the first component is held to the second component by the holding device, to a release mode using a magnetic force. By utilizing magnetic force, the attachment technology may be designed so that it is invisible from the outside. There is then no need to specially hide holes, slits or the like using rubber sleeves or rubber caps. Almost any number of the holding devices may be affixed to all statically critical regions in a manner that takes account of the loads experienced, in particular to a side of the component that faces away from the cabin interior, without having to satisfy any aesthetic considerations.

According to an embodiment, moving the holding device from the holding mode to the release mode may be achieved by additional manual action of force. Holding may be released by the additional manual action of force; in this case, release is, however, particularly easily and quickly.

According to a further embodiment, the holding device may comprise a housing, a spring element, and a pair of securing elements, in one example, half-ring-shaped. The spring element and the securing elements, preferably in the form of metal discs, are arranged in the housing such that the securing elements may be tilted against the spring force, which acts in axial direction, of the spring element.

Preferably, moving the holding device from the holding mode to the release mode is achieved using a magnetic key, which exerts the required magnetic force onto the holding device, in particular onto the pair of securing elements.

In one embodiment, the magnetic key may comprise a magnetic element and a cover that covers the magnetic element, preferably in the form of a glove. By using this glove with an integrated magnet, maintenance personnel have a simple tool that does not damage the component surfaces, some of which are easily damaged, by means of which tool not only the magnetic force, but also the pressure force may be exerted gently in order to overcome the holding action.

According to an embodiment, a component for use with the holding device is also disclosed. The component comprises a pin element with a securing groove, wherein in the holding mode, the securing elements of the holding device engage the securing groove, while in the release mode, the securing elements are disengaged. It is understood that the pin element in itself may already be the component, wherein the pin element may be fastened to some other component, for example, to an aircraft frame element.

Furthermore, the holding device is further improved with the incorporation of a decoupling element for the holding device. By using the decoupling element, mechanical oscillations, such as sound waves acting on the components, may be attenuated where the oscillations may be transmitted from one component to the other. The decoupling element may, for example, be a rubber bearing or a rubber sleeve. In this way, the holding device may be particularly advantageously sealed off from dirt and humidity, and in this way, the spring element located in the holding device may be protected from corrosion. In an alternative, the decoupling element itself may be a spring element in the form of a metal spring. Furthermore, the decoupling element may be designed so as to be in one piece with the holding device. The decoupling element may also be designed as a separate component so that it may be coupled to the holding device, or to one of the components, for example, by plugging on or plugging in.

Furthermore, the holding device is further improved by a set comprising at least one holding element and at least one further element, selected from the group consisting of the component, magnetic key, and decoupling element.

One embodiment relates to an aircraft in which a multitude of holding elements are used for holding cabin components, in particular, trim elements.

Finally, a method for deinstalling two components is disclosed where the components are held by a holding device. The method related steps are: pressing a first component against a second component, and placing a magnetic key on or over one of the components in the region of the holding device, wherein at least some method-related steps take place at substantially the same time. Substantially the same time means that the steps take place within a few seconds of each other, or at the same time.

DETAILED DESCRIPTION

The examples described and drawings rendered are illustrative and are not to be read as limiting the scope of the invention as it is defined by the appended claims.

Figure 1:
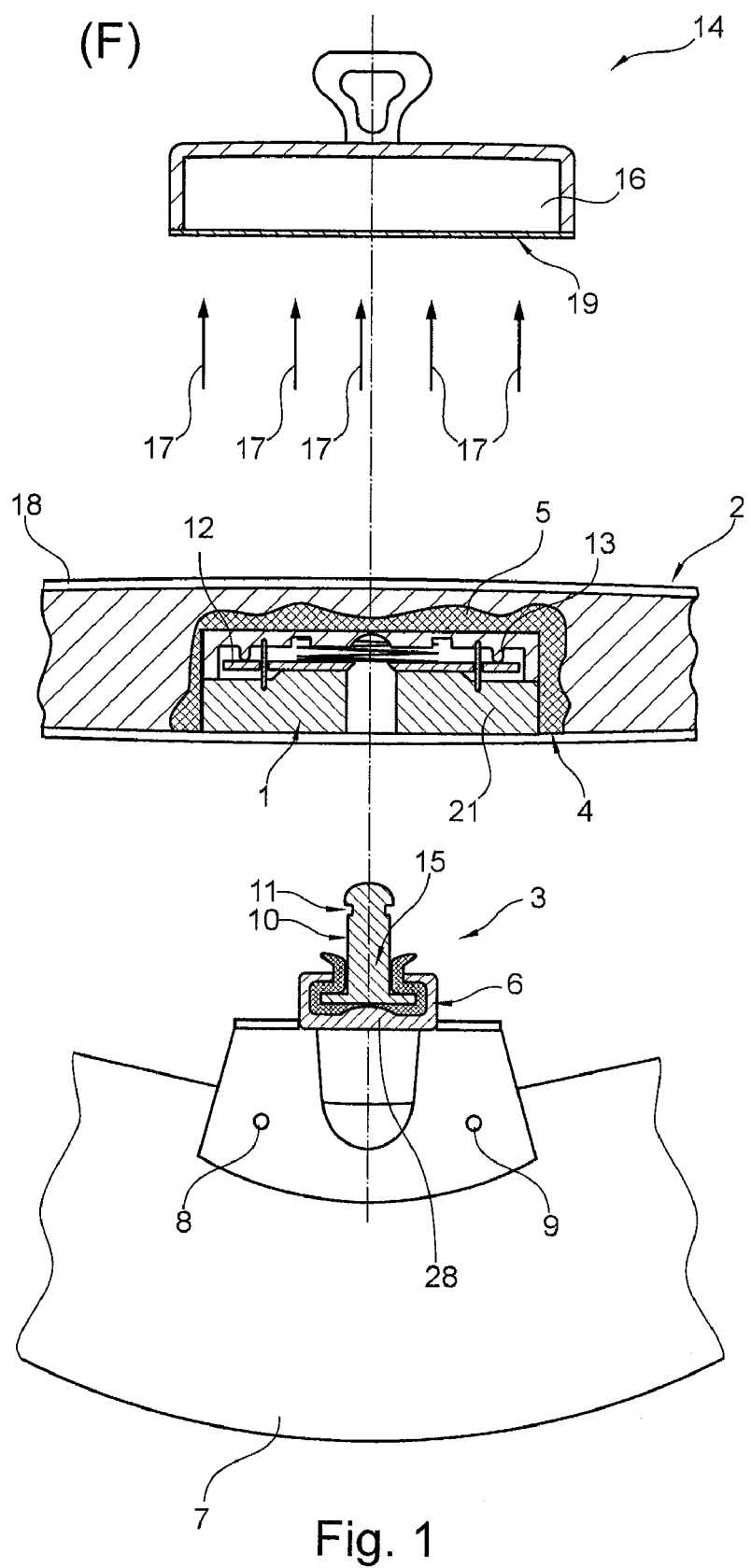
FIG. 1 diagrammatically shows a section view of a holding device according to one example, a magnetic key and three components.

FIG. 1 shows a holding device 1 for holding a first component 2 to a second component 3. In this arrangement, the holding device 1 is glued, using an adhesive 5, in a recess 4 of the first component 2, for example, the trim of the interior of an aircraft, service flaps, or flaps of electrical components that are inaccessible to passengers. Generally speaking, gluing on may also be used. The second component may be a holder in one example (not depicted). A decoupling element 6 in the form of a rubber bearing is placed on second component 3. The second component may be fastened to a further component 7, an aircraft frame element, using holes 8, 9 and by using screw connections (not shown in the diagram).

The holding device 1 may be coupled to the second component, which is a holder, in one example. For this purpose, in one example, the second component comprises a pin element 10 with a securing groove 11, where the two securing elements 12, 13 of the holding device 1 in the form of half-ring-shaped metal discs in a holding mode (not shown) may be made to engage, and in a release mode F may be made to disengage. In the holding mode, the decoupling element 6 is upset.

By using a magnetic key 14, a magnetic force may be exerted by a magnetic pin element 16 on the holding device 1, in particular, on the two securing elements 12, 13. In this arrangement, the magnetic force acts in the direction of the arrows 17, in other words, the securing elements 12, 13 are pulled towards the magnetic element 16. Below, an act of moving from the holding mode to the release mode F will be explained in more detail. In order to prevent the surface 18 of the component 2 from being scratched, the magnetic key comprises a cover 19 in the form of a piece of felt.

Moreover, the pin element 10 comprises a pin section and a plate element 15 that is connected in one piece to the pin section. The plate element 15 is held in the decoupling element 6 so as to be floating. In this way, the pin element 10 itself forms part of decoupling. A ball-segment-shaped elevation 28 delimits the axial movement options of the pin element 10, and in this way allows for the connection to be undone.

Figure 2:
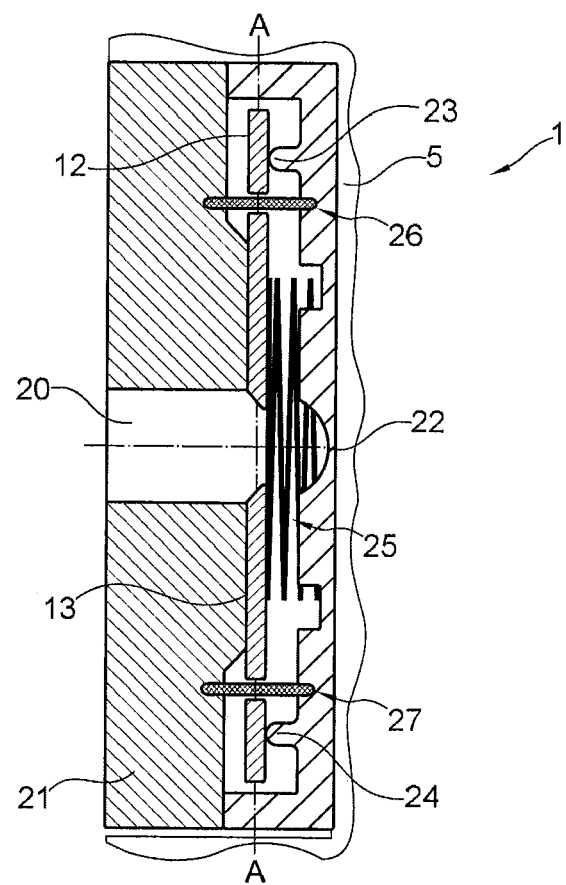
FIG. 2 shows a further section view of the holding device.
Figure 3:
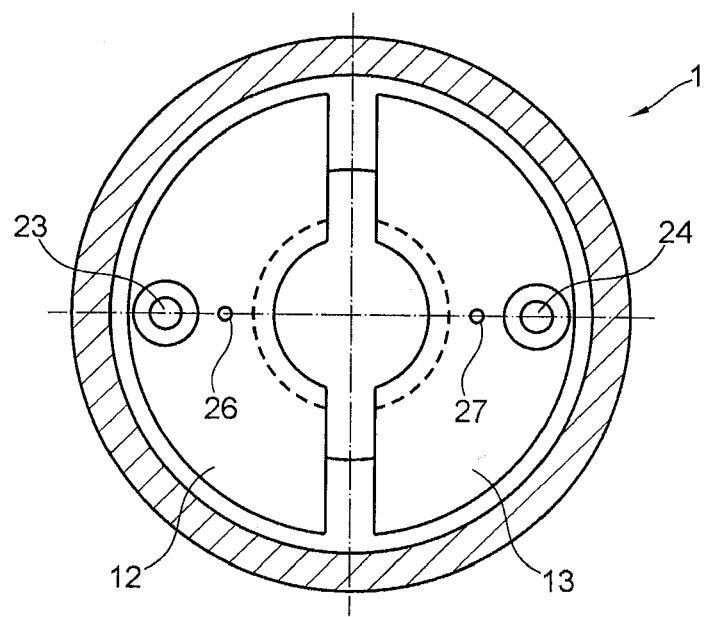
FIG. 3 shows a top view of the holding device according to a section line A-A shown in FIG. 2.

FIGS. 2 and 3 show various section views of the holding device, wherein FIG. 3 shows a section along the section line A-A in FIG. 2. In order to hold the component 2 that is shown in FIG. 1 by way of the holding device 1 to the component 3 in the form of the holder 5 and thus to the component 7 in the form of the frame element, the component 2 may be pressed in the correct position in the direction of the component 7. The holding mode is achieved when the pin 11 is inserted in a recess 20 of a housing 21 of the holding device 1 up to the end stop of the pin head onto the face 22 of the recess 20 in the form of a hole. The recess and/or the securing elements 12, 13 may also be designed as an elongated hole or may comprise an elongated hole in order to compensate for the tolerances in this manner. In this arrangement, the securing elements 12, 13, which in each case are tiltably held on a projecting part 23, 24 of the housing 21, slide against the axially acting spring force of a spring element 25 in the form of a spiral spring over the pin 10 where the securing elements 12, 13 engage the securing groove 11. Moreover, the securing elements 12, 13 are guided using guide rods 26, 27, in this example.

In order to deinstall the components 2, 3 or 2, 7, the component 2 is pressed against the component 7. At substantially the same time, the magnetic key 14 is applied to the component 2 and is placed as centrally as allowable over the holding device 1. The magnetic force of the magnetic key attracts the two securing elements, wherein, against the spring force of the spring element 25, which produces a lesser effect than does the magnetic force, the securing elements 12, 13 tilt over the point-shaped bearing formed by the projecting parts 23, 24 and leave the groove 11. Accordingly, the release mode F has been reached, and deinstallation is complete. The components may now be moved away from each other. Moreover, the tilt angle that may be achieved corresponds approximately to the angle of an internal cone of the two securing elements 12, 13.

Although in the description above the invention has been described with reference to a preferred embodiment, various changes and modifications may be made without the scope of protection of the invention being left.

Terms such as "comprising" etc. do not exclude the presence of other elements. The term "a" or "one" does not exclude a plural number.

The reference characters in the claims are used for improved legibility; they are in no way intended to limit the scope of protection of the claims.

Alternative combinations and variations of the examples provided will become apparent based on this disclosure. It is not possible to provide specific examples for all of the many possible combinations and variations of the embodiments described, but such combinations and variations may be claims that eventually issue.

What is claimed is:

1. A holding device for use in an aircraft comprising:
a decoupling attenuator coupled to a first cabin trim component such that transmission of mechanical vibrations from a second component to the first cabin trim component are attenuated by the decoupling attenuator, when the first cabin trim component is coupled to the second component by the holding device; and a magnetically coupled member releasably coupling the first trim component to the second component such that the holding device decouples the first trim component and the second component when acted on by a magnetic force, providing the holding device with a holding mode and a release mode; and wherein the holding device further comprises a housing, a spring element, and a pair of securing elements, wherein the spring element and the securing elements are movably arranged in the housing such that the pair of securing elements are tiltably movable against a spring force of the spring element, which biases the securing elements in an axial direction of the spring element such that the securing elements couple the first trim component and the second trim component in the holding mode and decouples the first trim component and the second trim component in the release mode, when the securing elements are tilted against the spring force.

2. The holding device of claim 1 wherein moving from the holding mode to the release mode is achieved using both the magnetic force and a physical force.

3. The holding device of claim 1, wherein the pair of securing elements are half-ring shaped.

4. The holding device of claim 1, further comprising a magnetic key.

5. The holding device of claim 4, wherein the magnetic key comprises a magnetic element and a cover that covers the magnetic element.

6. The holding device of claim 5, where the cover is in the form of a glove.

7. A holding system comprising:
the holding device of claim 1; and
a holder comprised of a pin element with a securing groove, wherein in the holding mode, the pair of securing elements of the holding device engage the securing groove of the pin element of the holder securing the pin element within the housing of the holding device, and in the release mode, the pair of the securing elements are tilted against the spring force such that the pair of securing elements are disengaged from the securing groove, decoupling the pin element of the holder from the holding device.

8. An aircraft comprising a holding element of claim 1, wherein a plurality of holding elements couple a first cabin trim component to a second cabin trim component.

9. The aircraft of claim 8, wherein the cabin components are trim elements.

10. A method for decoupling a first cabin trim component and a second cabin trim component coupled together by a holding device of claim 1, comprising:
placing a magnetic key on or over one of the first cabin trim component or the second cabin trim component adjacent to a region of the holding device; and
pressing a first cabin trim component against a second cabin trim component at the same time as the step of placing, such that the first cabin trim component and the second cabin trim component are decoupled by tilting of the pair of securing elements against a spring force.

* * * * *